UNITED STATES PATENT OFFICE.

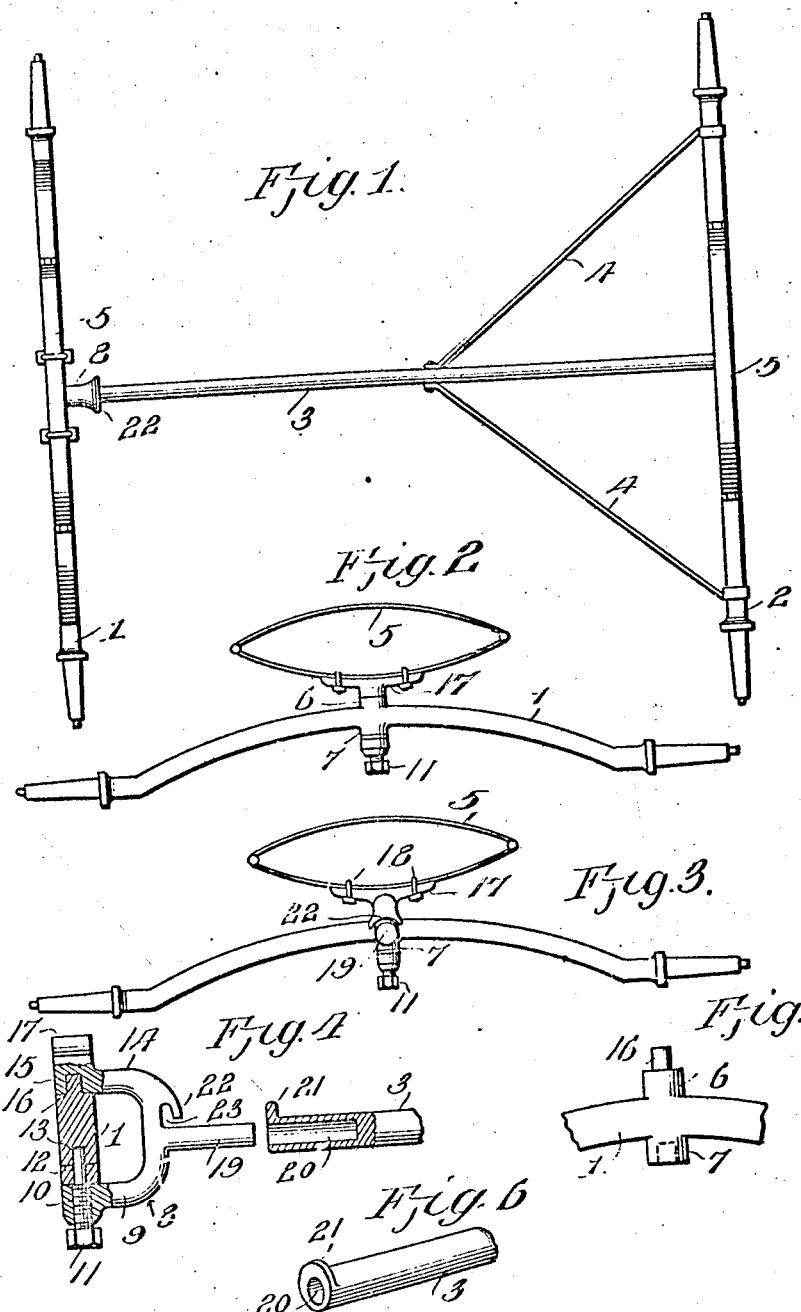

WILLIAM M. HARGROVE, OF PROSPECT, TENNESSEE.

RUNNING-GEAR.

No. 895,368.       Specification of Letters Patent.       Patented Aug. 4, 1908.

Application filed August 21, 1907. Serial No. 389,553.

To all whom it may concern:

Be it known that I, WILLIAM M. HARGROVE, a citizen of the United States, residing at Prospect, in the county of Giles and State of Tennessee, have invented new and useful Improvements in Running-Gears, of which the following is a specification.

This invention relates to horse-drawn vehicles, and more particularly to running gears for buggies and other vehicles.

The invention has for one of its objects to improve and simplify the construction of running gears so as to be comparatively easy and inexpensive to manufacture, of simple and substantial design, and thoroughly reliable in use.

A further object of the invention is the provision of a pivotal connection between the front axle and reach which permits of the parts to be readily detached and a fifth wheel construction dispensed with.

A further object of the invention is the employment of a yoke at the front end of the reach to which the axle is pivotally connected, the yoke being swiveled on the reach and detachably connected therewith.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a plan view of the running gears with the wheel removed. Fig. 2 is a front view of the fore-axle. Fig. 3 is a rear view thereof detached from the reach. Fig. 4 is a detail sectional view of the pivotal connection between the front axle and yoke, the yoke being disconnected from the reach bar. Fig. 5 is a detail view of the pivot or king bolt portion of the front axle. Fig. 6 is a detail perspective view of the front end of the reach.

Similar reference characters are employed to designate corresponding parts throughout the several views.

Referring to the drawing, 1 designates the front axle and 2, the rear axle that are connected together by a central reach 3, the rear end of the reach being connected with the back axle in any suitable manner and held rigidly in place by brace rods or struts 4. On the axles are supported transversely-extending elliptical body supporting springs 5 of ordinary form. The front axle, which may be arched as shown in Figs. 2 and 3, is formed at its center with oppositely-extending bosses 6 and 7 disposed vertically in line with each other. Straddling these bosses is a yoke 8 which is pivotally connected to the bosses. In the preferred construction, the lower arm 9 has its terminal provided with a vertical aperture 10 for the reception of a bolt 11 that has threaded engagement therein, the said bolt having its inner end formed into a pivot 12 that engages in a socket 13 in the bottom boss 7 of the axle. The under side of the upper arm 14 of the yoke has a socket 15 into which engages a stud or pivot 16 on the top boss 6, thereby pivotally connecting the front axle with the yoke, so that the axle can turn on a vertical axis, as in steering or guiding the vehicle. On the top arm is integrally formed a seat 17 to which the front springs 5 are connected by clips 18.

Extending rearwardly from the yoke 8 is a horizontal pivot 19, as clearly shown in Fig. 4, that engages in a socket 20 extending inwardly from the front end of the reach 3, whereby the front axle can tilt about the reach of the horizontal axis, as in passing over inequalities in the surface over which the vehicle passes. In order to lock the yoke and reach together, the latter has a vertically-extending semi-annular flange 21, as shown in Figs. 4 and 6, that is adapted to engage under a yoke 22 formed by providing an L-shaped slot 23 in the rear side of the arm 14 of the yoke at the root thereof. To unlock the yoke from the reach, the front axle is turned through ninety degrees or to a vertical position so as to throw the lip or flange 21 out of alinement with the hook 22, whereupon the front axle can be pulled forwardly to disengage the pivot 19 from the socket 20. It will thus be seen that the front axle can be readily detached after the body of the vehicle has been removed, and furthermore, the front axle can freely move on a vertical and a horizontal axis, as will be readily understood.

From the forgoing description, taken in connection with the accompanying drawing, the advantages of the construction and of the method of operation will be readily apparent to those skilled in the art to which the invention appertains, and while I have described the principle of operation of the invention, together with the apparatus which I consider to be the best embodiment thereof, I desire to have it understood that the apparatus shown is merely illustrative and that such changes may be made when desired as are within the scope of the claims.

Having thus described the invention, what I claim is:—

1. In a running gear for vehicles, the combination of a reach provided with a longitudinally-extending socket at one end, a yoke provided with a socket and having a pivot engaging in the socket of the reach, means for detachably locking the yoke and reach together, an axle provided with a central vertically-extending stud engaging in the socket of the yoke, and means coöperating with the said stud for pivotally connecting the yoke and axle together.

2. In a running gear for vehicles, the combination with a reach provided with a socket at one end, and a transversely extending lip, a yoke having one arm provided with an aperture and the other arm with a socket, a pivot extending horizontally and disposed in the socket of the reach, a hook on one of the arms of the yoke coöperating with the said lip for locking the yoke and reach together, an axle having an integral pivot engaging in the socketed arm and provided with a depression in line with the pivot, and a pivot bolt having threaded engagement in the aperture of the other arm of the yoke and extending into the depression for pivotally connecting the axle with the yoke.

3. In a running gear for vehicles, the combination with a reach, a yoke provided with arms one of which has a vertical opening and the other a socket arranged in line with the opening, a spring seat formed on one of the arms, an axle provided with oppositely disposed bosses, one of which is socketed, a pivot stud on the other boss engaging in the socketed arm, a bolt having threaded engagement in the apertured arm and extending into the socketed boss, a pivotal connection between the yoke and reach, and a locking device for connecting the reach and yoke together, said device comprising a transversely extending lip on one of the parts and a yoke on the other part engaging and disengaging the lip by relative rotary movement.

In testimony whereof, I affix my signature in presence of two witnesses.

WILLIAM M. HARGROVE.

Witnesses:
L. P. LOGAN,
ED. HARGROVE.